United States Patent [19]

Schlenker

[11] 4,093,427

[45] June 6, 1978

[54] METHOD FOR SEPARATING ISOTOPES

[76] Inventor: Ralph F. Schlenker, R.R. #4, Indianola, Iowa 50125

[21] Appl. No.: 543,232

[22] Filed: Jan. 23, 1975

[51] Int. Cl.² .................................... B01D 57/00
[52] U.S. Cl. .................................... 55/17; 55/2; 55/101; 55/267; 55/419; 55/459 R; 62/5; 55/342
[58] Field of Search ................... 55/17, 1, 3, 2, 267, 55/459 R, 100, 101, 419, 342; 62/5; 250/251, 281, 282

[56] References Cited

U.S. PATENT DOCUMENTS

| 2,741,899 | 4/1956 | Von Linde | 62/5 |
|---|---|---|---|
| 3,296,807 | 1/1967 | Fekete | 62/5 |
| 3,426,513 | 2/1969 | Bauer | 55/459 |
| 3,460,318 | 8/1969 | Creutz | 55/17 |
| 3,558,877 | 1/1971 | Pressman | 55/17 |
| 3,566,610 | 3/1971 | Fiore | 62/5 |
| 3,722,677 | 3/1973 | Lehnert | 55/3 |
| 3,747,306 | 7/1973 | Wikdahl | 55/17 |
| 3,922,871 | 12/1975 | Bolesta | 62/5 |

FOREIGN PATENT DOCUMENTS 1,245,329  7/1967  Germany .................................... 55/17

Primary Examiner—Bernard Nozick
Attorney, Agent, or Firm—Zarley, McKee, Thomte, Voorhees & Sease

[57] ABSTRACT

The present invention utilizes a vortex tube for separating isotopes. A gas mixture containing the isotopic molecules enters the vortex tube under pressure and is separated into a hot discharge flow stream and a cold discharge flow stream. The hot discharge is enriched in lighter isotopic molecules whereas the cold discharge flow stream is enriched in the heavier isotopic molecules. The vortex tube can be used in a single stage or multistage isotope separation apparatus.

5 Claims, 7 Drawing Figures

METHOD FOR SEPARATING ISOTOPES

SUMMARY OF THE INVENTION

The present invention relates to a method for separating isotopes. The separation of isotopes is particularly important with respect to work in the development of nuclear energy. Isotopes are atoms of the same basic element which have different nuclear masses but identical chemical properties and atomic numbers. Uranium is an example of an element which includes many isotopes having different masses. Dueterium is an isotope of hydrogen which can be separated by use of its mass difference.

Presently known methods for separating isotopes include the use of highly cumbersome and expensive equipment. Some methods include utilizing a centrifuge and others use diffusion apparatus for separating the isotopes. Several other methods are known.

The present invention utilizes the vortex tube to separate the isotopes. A vortex tube is an instrument capable of converting a supply of compressed gas into two streams, one hot and one cold. Operating in this manner, the vortex tube is an energy separator. The present invention utilizes the vortex tube as a mass separator. Thus it is possible to separate a mixture of isotopes having different masses.

According to the present invention, a gaseous feedstock mixture enters the vortex tube in a compressed state and exits the vortex tube in two discharge streams of unequal temperature. The hotter discharge stream is enriched in the lighter isotope component and depleted in a heavier isotope. Conversely, the colder discharge stream is enriched in the heavier isotope and depleted in the lighter isotope component. The vortex tube may be operated as a single stage separator or, at option, may be arranged with many vortex tubes operating as an isotopic molecular separator in a cascade. Further, the vortex stages may be adapted to operate in conjunction with other separative means, such as a gaseous diffusion barrier or centrifuge, substituted for the vortex tubes.

Further modification of the present invention contemplates directing a narrow beam of electromagnetic waves of discrete frequency along the central axis of the vortex tube. The frequency of the electromagnetic waves is tuned to the vibrational mode of the lighter isotope in the mixture. The effect of the electromagnetic beam is to excite the lighter isotopes and cause them to transport or scatter from the central core or axis of the vortex tube to the outer periphery thereof, thereby facilitating the separation of the heavier and lighter isotopes. The heavier isotopes having a different vibrational mode will remain substantially unaffected by the electromagnetic beam.

Therefore, a primary object of the present invention is the provision of a method for separating isotopes.

A further object of the present invention is the provision of a method which is economical, and which separates the isotopes with relatively inexpensive equipment.

A further object of the present invention is the provision of a method which utilizes simple equipment which requires a minimum of energy input for its operation.

BRIEF DESCRIPTION OF THE DRAWING

This invention consists in the construction, arrangements, and combination of the various parts of the device, whereby the objects contemplated are attained as hereinafter more fully set forth, specifically pointed out in the claims, and illustrated in the accompanying drawings in which:

DETAILED DESCRIPTION OF THE DRAWINGS

Figure 3:
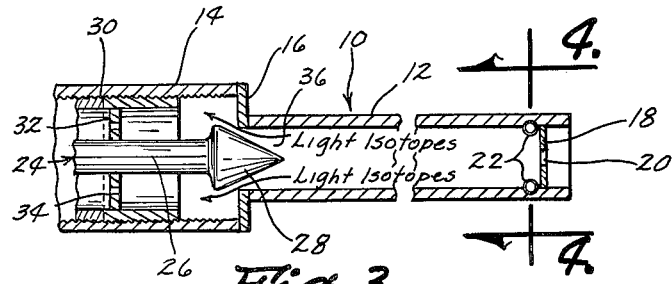
FIG. 3 is a sectional side view of a counter flow vortex tube.
Figure 4:
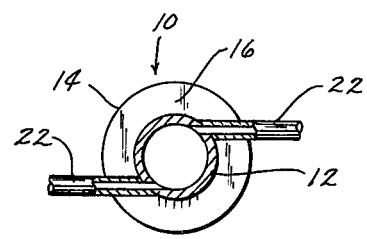
FIG. 4 is a view taken along line 4—4 of FIG. 3.

A typical counter flow vortex tube is shown in FIG. 3. A counter-flow assembly 10 comprises a flow tube 12 having at one end thereof an enlarged diameter portion 14. Between tube 12 and enlarged diameter portion 14 is an annular body flange 16. At one end of tube 12 is a diaphram 18 having a cold outlet opening 20 which is positioned along the longitudinal axis of tube 12. Adjacent diaphram 18 are a pair of inlet nozzles 22 for introducing a gaseous mixture into the tube 12. Nozzles 22 are positioned so that they inject the mixture tangentially into the tube so that the mixture will swirl in a circular motion around the longitudinal axis of tube 12.

A flow control assembly 24 is positioned adjacent annular flange 16. Assembly 24 includes a shank 26 and a cone-shaped head 28 which is inserted into tube 12 in a needle valve-like fashion. Shank 26 is operatively connected to a lock ring 30 by means of a radially extending web 32. Web 32 includes apertures 34 therein for permitting gas to escape therethrough. Lock ring 30 is threaded within the interior of enlarged diameter portion 14 so as to permit the longitudinal adjustment of the position of head 28 with respect to flow tube 12. Thus it can be seen that a hot outlet opening 36 is provided between the inner margins of annular flange 16 and the outer surface of head 28.

Figure 5:
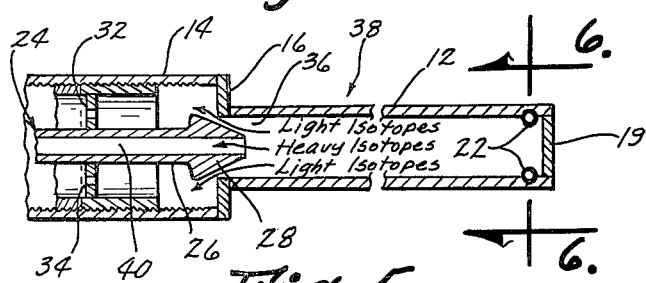
FIG. 5 is a sectional side view of a direct flow vortex tube.
Figure 6:
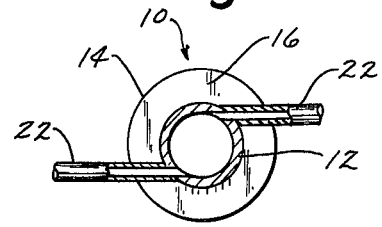
FIG. 6 is a sectional view taken along line 6—6 of FIG. 5.

FIG. 5 illustrates a direct flow assembly 38 which includes many of the same components that counter flow assembly 10 includes. The primary difference between the two assemblies is that diaphram 19 of assembly 38 does not include an opening therein such as opening 20 found in assembly 10. Additionally a cold outlet opening is provided by a longitudinal bore 40 which extends axially through flow control assembly 24.

The preferred material for the two vortex tubes is nickel. All adjoining surfaces of the components of the vortex tubes are welded with the exceptions of the threaded inner faces between lock ring 30 and enlarged diameter portion 14 of assembly 10.

In operation of the device in FIG. 3, a gaseous mixture of one or more isotopes is introduced through inlet nozzles 22. The mixture swirls within tube 12 and progresses longitudinally toward flow control cone 24. Hot outlet opening 36 is restricted so that the gas which is permitted to exit from opening 36 exits at a rate less than the rate at which it is introduced through inlet nozzles 22. This restriction may be adjusted by longitudinal threaded movement of lock ring 30. Because not all of the gas is permitted to exit through outlet 36, a certain amount is redirected along the longitudinal axis of tube 12 and exits outwardly through cold outlet opening 20. The gaseous mixture exiting through outlet 36 is enriched in light isotope and the gaseous mixture exiting outwardly through outlet opening 20 is enriched in heavier isotopes.

In the device of FIG. 5, the gaseous mixture is introduced in the same fashion as previously described. However, the heavier isotopes exit outwardly through bore 40 in flow control assembly 24 instead of exiting outwardly through opening 20 as in FIG. 3, tube 10. Thus it can be seen that in direct flow vortex tube 38, the gaseous flow continues in one direction along the length of tube 12. In counter flow assembly 10 the heavy isotopes exit in a reverse direction from the direction that the light isotopes exit. In direct flow assembly 38 the light and heavy isotopes exit the same end of the tube.

Figure 7:
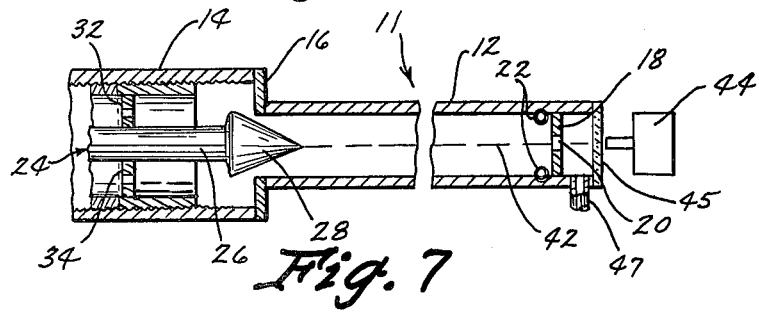
FIG. 7 is a sectional view of a counter flow vortex tube utilizing an electronic beam to excite the isotopes along the longitudinal axis thereof.

Referring to FIG. 7, a modified form of the invention is shown which utilizes a beam of electromagnetic waves designated by the numeral 42. A microwave beam generator 44 directs beam 42 axially along the length of tube 12 so that beam 42 is approximatey aligned with the longitudinal center line thereof and has a diameter restricted not to exceed that of the opening 20.

The modification of FIG. 7 is designated by the numeral 11. It is similar to the device of FIG. 3 with exception that a window 45 is placed over the right hand end and a gas outlet tube 47 is provided for facilitating exit of the gas coming through opening 20. The window must be transparent to the microwave beamed into the tube and yet be noncorrosive insofar as the gas input. Quartz would suffice in this use since it is chemically inert to gas.

The same modification can be adapted to the direct flow assembly as has been shown in FIG. 7 for the counter flow. The beam would then be directed through a window at the left of bore 40 and thence through bore 40 along the axis of assembly 38.

Since the microwave beam has an energy content, the material where it finally impinges must be capable of heat dissipation. In FIG. 7 the cone section must allow the microwave energy to pass through to an external target, where the beam spends energy and accompanying local heating will take place. Adaptation of the direct flow tube assembly to microwave excitation will similarly require an exit window of quartz in line with the beam entrance, and backed up by a target and heat sink to dispose of the beam energy without disruption of heat balances in the vortex tube assembly.

The microwave beam serves simply as a columnator for the energy particles, and this column will have a higher than ordinary composition of heavy particles.

Each isotope has a vibrational mode which is unique to that particular isotope. Thus it is possible by adjusting the frequency of beam 42 to tune the frequency to the vibrational mode of the ligher isotope. The effect of this is to excite the lighter isotopes and cause them to scatter or spread radially outwardly to the outer pheripheral edge of tube 12.

While the thermodynamic states of pressure and temperature of the gaseous mixture may be varied, the following is an example of a preferred combination of factors. The gaseous isotopic material may enter the vortex tube of either design at a temperature of 260° C. and may possess an absolute pressure of four atmospheres. The proper position of the flow control assembly for the counter flow vortex tube should be that which allows a mass flow rate of about 40% of the isotopic mixture material to discharge through diaphram 18 and about 60% of the isotopic material to discharge through outlet opening 36 when the ambient pressure in the outlet passage is one atmosphere. Also the proper position for the flow control assembly of the direct flow control cone of the direct flow vortex tube should be that which allows a mass flow rate of about 40% of the uranium material to discharge through the central hole in central hole 40 in the flow control assembly and about 60% of the uranium material to the discharge on the outside of the flow control assembly through opening 36 when the pressure in the region outside the flow control assembly is one atmosphere and the pressure inside the central hole of the flow control cone is also one atmosphere.

Figure 1:
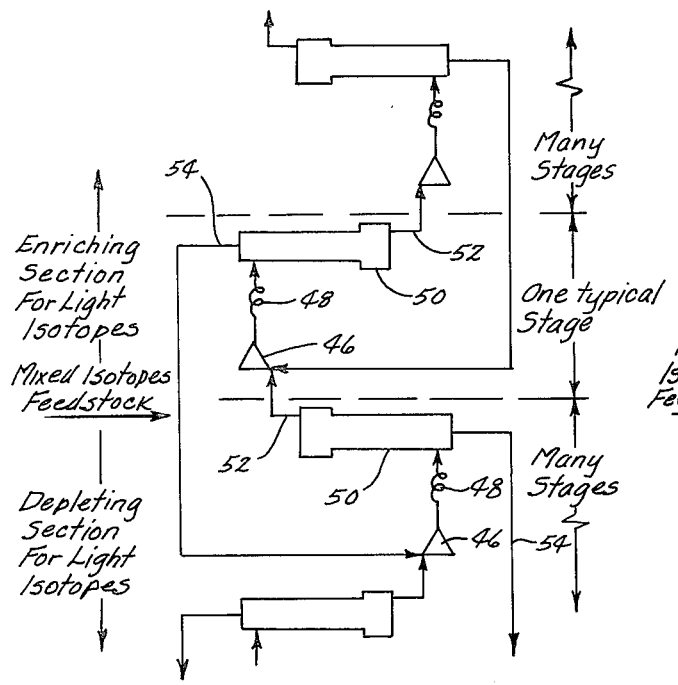
FIG. 1 is a schematic diagram illustrating the simultaneous operation of several vortex tubes in an isotope separation cascade device.

Referring to FIG. 1, a system of cascades is shown. Each stage is comprised of a pump 46 and a cooler 48 followed by a vortex tube 50. The vortex tube has two outlet conduits. One outlet conduit 52 transports material enriched in the lighter isotope to the pump inlet of the succeeding stage and the other conduit 54 transports material depleted in lighter isotope to the pump inlet of the prior stage.

Figure 2:
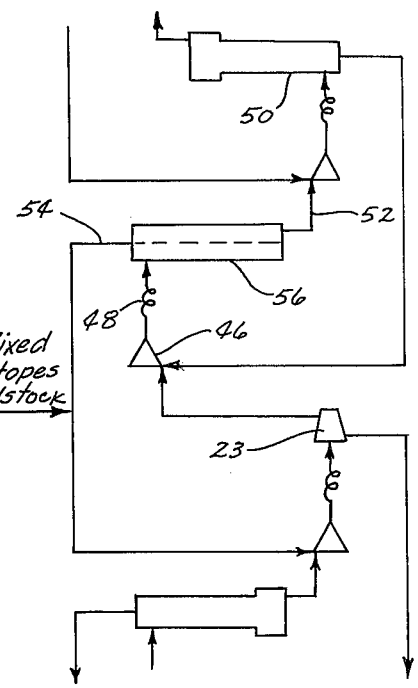
FIG. 2 is a schematic diagram illustrating the connection of several vortex tubes with other species of isotope separation units.

Referring to FIG. 2 of the drawings, a schematic diagram is shown of an isotopic molecule separation cascade identical to FIG. 1 with exception that some, but not all, of the vortex tubes have been removed and are replaced by other species of isotope separators. The substituted isotope separators may include, but are not limited to, diffusion barriers 56 and/or centrifuge devices 23.

Thus it can be seen that the device accomplishes at least all of its stated objectives.

What is claimed is:

1. A method for separating a mixture of heavy and light isotopes comprising:
   introducing a gaseous feed stock mixture containing light and heavy isotopes under sufficient pressure and temperature into an elongated cylindrical vortex tube in a circumferential fashion so as to impart a swirling action of said mixture within said tube around the longitudinal axis thereof which separates said mixture into a warmer outer, radial portion and a cooler inner, radial portion;
   drawing off said outer radial portion of said swirling mixture which comprises about 60% of the feed stock mixture adjacent the cylindrical walls of said tube through an outer opening spaced radially outwardly from the longitudinal axis of said tube;
   drawing off the inner radial portion of said whirling mixture which comprises about 40% of the gaseous feed stock mixture through an axial outlet located approximately along the longitudinal axis of said tube, said inner radial portion exiting from said axial outlet being enriched with heavy isotopes and said outer radial portion exiting from said outer opening being enriched in light isotopes.

2. A method according to claim 1 comprising recycling said mixture exiting from said outlet through another vortex tube in similar fashion so that further separation of heavy and light molecules is accomplished.

3. The method of claim 1 comprising cycling said heavy isotope enriched mixture and said light isotope enriched mixture to species of isotope separation different from said vortex tube.

4. A method according to claim 1 comprising introducing an electromagnetic beam along the longitudinal axis of said tube, said beam having a frequency band tuned to the vibrational modes of said light isotopes whereby said light isotopes will be excited and will scatter radially outwardly.

5. A method according to claim 4 comprising introducing an electromagnetic beam of limited diameter along the longitudinal axis of said tube.

* * * * *